United States Patent
Kim et al.

(10) Patent No.: US 8,458,242 B2
(45) Date of Patent: Jun. 4, 2013

(54) MODULAR MULTIPLIER APPARATUS WITH REDUCED CRITICAL PATH OF ARITHMETIC OPERATION AND METHOD OF REDUCING THE CRITICAL PATH OF ARITHMETIC OPERATION IN ARITHMETIC OPERATION APPARATUS

(75) Inventors: Young-sik Kim, Hwaseong-si (KR); Mi-jung Noh, Yongin-si (KR); Kyoung-moon Ahn, Seoul (KR); Sun-soo Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 582 days.

(21) Appl. No.: 12/660,382

(22) Filed: Feb. 25, 2010

(65) Prior Publication Data
US 2010/0293216 A1 Nov. 18, 2010

(30) Foreign Application Priority Data
May 15, 2009 (KR) .................. 10-2009-0042541

(51) Int. Cl.
G06F 7/72 (2006.01)
(52) U.S. Cl.
USPC .......................................... 708/491
(58) Field of Classification Search
None
See application file for complete search history.

(56) References Cited

U.S. PATENT DOCUMENTS

| 6,671,709 | B2 * | 12/2003 | Glaser et al. | 708/492 |
|---|---|---|---|---|
| 7,543,011 | B2 * | 6/2009 | Yoon et al. | 708/491 |
| 7,805,478 | B2 * | 9/2010 | Son | 708/491 |
| 2003/0009503 | A1 * | 1/2003 | Glaser et al. | 708/625 |
| 2004/0252829 | A1 | 12/2004 | Son | |
| 2005/0185791 | A1 * | 8/2005 | Chen et al. | 380/30 |
| 2006/0269054 | A1 * | 11/2006 | Dror et al. | 380/28 |

FOREIGN PATENT DOCUMENTS

| KR | 2000-0000770 A | 1/2000 |
|---|---|---|
| KR | 10-0591761 B1 | 6/2006 |
| KR | 10-2008-0049266 A | 6/2008 |

* cited by examiner

*Primary Examiner* — David H Malzahn
(74) *Attorney, Agent, or Firm* — Onello & Mello, LLP

(57) ABSTRACT

Provided are a modular multiplier apparatus in which a value of a long path carry (LPC) is predicted to reduce a critical path of an arithmetic operation of Montgomery modular multiplication, and a method of reducing the critical path of the arithmetic operation. The modular multiplier apparatus for obtaining a quotient and a result of an arithmetic operation of modular multiplication by using a modulus and two arbitrary constants includes: a reduction unit for obtaining a short path carry (SPC) included when a result of a modular arithmetic operation is obtained at a current stage, by using a medium calculation result; a carry predictor for predicting a long path carry (LPC) included when the result of the modular arithmetic operation is obtained at the current stage, by using the medium calculation result; and an accumulator for accumulating the result of the modular arithmetic operation by using the SPC and the LPC, wherein the medium calculation result is obtained by adding a result of a modular arithmetic operation obtained at a previous stage and a partial product of the two constants obtained at the current stage.

9 Claims, 6 Drawing Sheets

MODULAR MULTIPLIER APPARATUS WITH REDUCED CRITICAL PATH OF ARITHMETIC OPERATION AND METHOD OF REDUCING THE CRITICAL PATH OF ARITHMETIC OPERATION IN ARITHMETIC OPERATION APPARATUS

CROSS-REFERENCE TO RELATED APPLICATIONS

This application claims the benefit of Korean Patent Application No. 10-2009-0042541, filed on May 15, 2009, in the Korean Intellectual Property Office, the entire contents of which are incorporated herein by reference.

BACKGROUND

The inventive concept relates to a modular multiplier apparatus, and more particularly, to a modular multiplier apparatus with a reduced critical path of an arithmetic operation.

The Rivest Shamir Adleman (RSA) algorithm is an Internet cryptography and authentication system in which encryption and decryption are performed using a public key and a private key generated using two large prime numbers. RSA involves a public key and a private key, which are constituted by performing multiplication of two large prime numbers and an additional arithmetic operation thereon. Information (in particular, an e-mail) used in the Internet are encrypted and decrypted using the public key and the private key. A principle of the RSA algorithm is disclosed at the RSA Internet web site at http://www.rsa.com. The time required for encryption and decryption in a public-key cryptography system increases as the lengths of keys used increase. In order to solve a problem that the number of calculations increases in an RSA cryptography system and an operation time required for a large amount of calculations increases, an elliptic curve algorithm has recently been considered as an alternative to the RSA algorithm.

In a public-key cryptography system such as an RSA algorithm system or elliptic curve cryptography system, a modular operation is performed on very large numbers. Thus, the performance of a security system is determined by the speed and efficiency of the modular operation. In particular, in the case of the RSA algorithm, at least 2,048-bit keys are used for high security, and it is desired that 4,096-bit keys be used in the future. Under such circumstances, it is very important in several applied fields to implement the modular operation at high speed.

There are several algorithms with which modular multiplication is performed. Among them, a Montgomery modular multiplication technique is widely used to implement hardware. Research on implementing hardware by using the Montgomery modular multiplication technique has been widely conducted for the last 20 years. However, in most cases, radix 2, radix 4, or radix 8 is used. It is well known that increasing radix is the best way to increase the operation speed. However, as an exponent of radix increases, a procedure of determining a quotient becomes complicated. Thus, there is a limitation in increasing an exponent of radix.

In a high radix operation, a pipeline method is widely used to reduce a critical path of an arithmetic operation. Due to an operation characteristic of the Montgomery modular multiplication, the result of adding the previous result of an arithmetic operation and a product of constants used in calculation is needed so as to obtain a current quotient. When the pipeline method is used, values such as the previous result of an arithmetic operation and the product of constants used in calculation do not need to be separately obtained.

In the Montgomery modular multiplication using radix $2^k$ (where k is an integer), subtraction is performed to a lower k-bit. In this procedure, in order to obtain the final result in a non-redundant form, at least k-bit carry propagation occurs, which causes an operation delay of about 12% to about 40%.

SUMMARY

The inventive concept provides a modular multiplier apparatus in which a value of a long path carry is predicted to reduce a critical path of an arithmetic operation of Montgomery modular multiplication.

The inventive concept also provides a method of reducing the critical path of the arithmetic operation.

According to an aspect of the inventive concept, there is provided a modular multiplier apparatus for obtaining a quotient and a result of an arithmetic operation of modular multiplication by using a modulus and two arbitrary constants, the modular multiplier apparatus including: a reduction unit for obtaining short path carry (SPC) included when a result of a modular arithmetic operation is obtained at a current stage, by using a medium calculation result; a carry predictor for predicting long path carry (LPC) included when the result of the modular arithmetic operation is obtained at the current stage, by using the medium calculation result; and an accumulator for accumulating the result of the modular arithmetic operation by using SPC and LPC, wherein the medium calculation result is obtained by adding a result of a modular arithmetic operation obtained at a previous stage and a partial product of the two constants obtained at the current stage.

In one embodiment, a value of the LPC is 0 if binary bits that constitute the medium calculation result are all "0"s and when only a most significant bit (MSB) of the binary bits is 1 and the other bits are all "0"s, and if otherwise, the value of the LPC is 1. In one embodiment, when a modified booth recoding method is applied to the quotient, a value of the LPC is 0 when a value of the medium calculation result is 0, and when the value of the medium calculation result is not 0, the value of the LPC is 1.

In one embodiment, if it is determined that subtraction on the arithmetic operation is not generated by the reduction unit, a feedback decision unit propagates the LPC that is obtained at the previous stage to be output from the carry predictor to the reduction unit, wherein the reduction unit shifts the LPC to an operation at the next stage.

In one embodiment, the result of the modular arithmetic operation that is obtained at the current stage is obtained by adding a product of the result of the arithmetic operation obtained at the previous stage and the medium calculation result and a product of a quotient obtained at the previous stage and a modulus, and the quotient of modular multiplication is obtained by the sum of modular arithmetic operations of a product of the modulus and the product of the result of the arithmetic operation obtained at the previous stage.

According to another aspect of the inventive concept, there is provided a method of reducing a critical path of a modular arithmetic operation of a modular multiplier apparatus for obtaining a result of the modular arithmetic operation at a current stage by using a modulus and two arbitrary constants, the method comprising: defining a medium calculation result; determining a value of long path carry according to the medium calculation result; and determining a use of the value of LPC on whether reduction is performed on the modular arithmetic operation, wherein the medium calculation result is obtained by adding a result of a modular arithmetic operation obtained at a previous stage and a partial product of the two constants obtained at the current stage.

In one embodiment, the determining of the value of the LPC comprises: determining whether binary bits that constitute the medium calculation result are all "0"s or whether only a most significant bit (MSB) of the binary bits is 1 and the other bits are all "0"s; if the binary bits that constitute the medium calculation result are all "0"s or if only the MSB of the binary bits is 1, determining the value of the LPC as 0; and if the binary bits that constitute the medium calculation result are all "0"s or if only the MSB of the binary bits is not 1, determining the value of the LPC as 1.

In one embodiment, the determining of the use of the value of the LPC comprises: determining whether reduction is performed on the modular arithmetic operation when the result of the modular arithmetic operation is obtained at the previous stage; if it is determined that reduction is not performed on the modular arithmetic operation, shifting the LPC that is obtained at the previous stage when the result of the modular arithmetic operation is obtained at the current stage; and if reduction is performed on the modular arithmetic operation, shifting the LPC obtained at the previous stage when the result of the modular arithmetic operation is obtained at the current stage.

In one embodiment, when a modified booth recoding method is applied to a quotient obtained when the result of the modular arithmetic operation at the current stage, the value of the LPC is 0 when a value of the medium calculation result is 0, and when the value of the medium calculation result is not 0, the value of the LPC is 1. In one embodiment, the result of the modular arithmetic operation that is obtained at the current stage is obtained by adding a product of the result of the arithmetic operation obtained at the previous stage and the medium calculation result and a product of a quotient obtained at the previous stage and a modulus, and the quotient of modular multiplication is obtained by the sum of modular arithmetic operations of a product of the modulus and the product of the result of the arithmetic operation obtained at the previous stage.

BRIEF DESCRIPTION OF THE DRAWINGS

Exemplary embodiments of the inventive concept will be more clearly understood from the following detailed description taken in conjunction with the accompanying drawings.

DETAILED DESCRIPTION OF THE EMBODIMENTS

Figure 1:
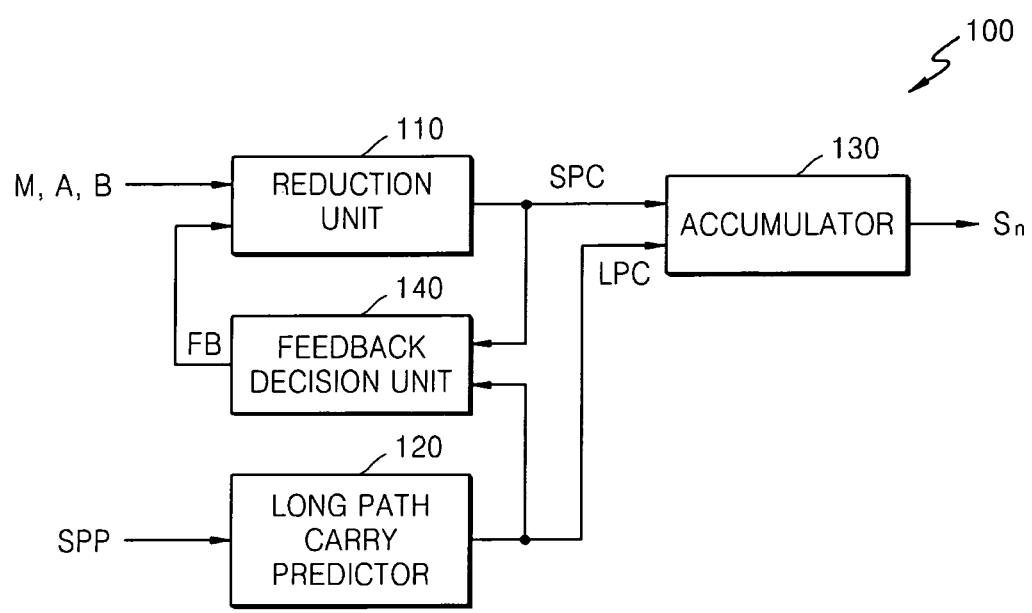
FIG. 1 is a block diagram of a modular multiplier with a reduced critical path of an arithmetic operation, according to an embodiment of the inventive concept.

The attached drawings for illustrating exemplary embodiments of the inventive concept are referred to in order to gain a sufficient understanding of the inventive concept, the merits thereof, and the objectives accomplished by the implementation of the inventive concept.

Hereinafter, the inventive concept will be described in detail by describing exemplary embodiments of the invention with reference to the attached drawings. Like reference numerals in the drawings denote like elements.

In a Rivest Shamir Adleman (RSA) cryptography system in which a message is encrypted and decrypted by performing a modular exponentiation operation by using a public key and a private key, a modular multiplication operation is generally used as a basic unit operation. In order to quickly predict a value of carry generated during modular multiplication, a modular multiplier such as a modular multiplier 100 of FIG. 1 according to an embodiment of the inventive concept uses a medium calculation result SPP that is defined using a modulus M and two arbitrary constants A and B.

Here, the medium calculation result SPP is defined as $(S_{i-1}+B_iA)$, which, when a current stage is assumed as I, is obtained by adding the result $S_{i-1}$ of a modular arithmetic operation (where i is an integer) that is obtained at the previous stage and a partial product $B_iA$ of two arbitrary constants A and B that are obtained at the current stage. Thus, the value of carry generated during modular multiplication can be quickly predicted.

Specifically, a high radix Montgomery multiplication operation may be expressed as below: Radix in the form of the square of 2 is used to easily implement hardware.

Algorithm: High radix Montgomery multiplication
Inputs: $2^{r-1} < M < 2^r$ $-M < A, B < M$ where $$B = \sum_{i=0}^{n-1} B_i 2^{ki} \text{ and}$$

$B_i \in \{0, 1, \ldots, (2^k - 1)\}$

Output: $S_i = AB2^r \mod M$
1. $S_0 = B_0 A$
2. For i=1 to n+1

$$q_i = -\frac{1}{M} \times S_{i-1} \mod 2^k. \quad \text{A}$$

$$S_i = \frac{S_{i-1} + B_i A + q_{i-1} M}{2^k}. \quad \text{B}$$

3. If $S_{n+1} < 0$ then $S_{n+1} = S_{n+1} + M$

Here, a quotient $q_{i-1}$ does not need to be obtained in each loop, as expressed in 2.A. In this case, a partial product of two arbitrary constants A and B has been already shifted to the result $S_{i-1}$ of a modular arithmetic operation that is obtained at the previous stage.

In an embodiment of the inventive concept, the medium calculation result SPP is defined using Equation 1 so as to reduce a critical path of an arithmetic operation:

$$SPP = S_{i-1} + B_i A \quad (1)$$

As shown in Equation 1, the medium calculation result SPP is obtained by adding the result $S_{i-1}$ of the modular arithmetic operation that is obtained at the previous stage and the partial product $B_iA$ of two arbitrary constants A and B. When the medium calculation result SPP is defined in the above manner, the partial product $B_iA$ does not need to be added to the result $S_{i-1}$ of the modular arithmetic operation obtained at the previous stage when a quotient q is determined and the result $S_{i-1}$ of the modular arithmetic operation obtained at the previous stage is used, so that the critical path of the modular arithmetic operation can be reduced.

Even when the medium calculation result SPP defined in the above manner is used, carry is generated during the reduction calculation of lower bits when the result $S_i$ of the modular arithmetic operation is obtained at a current stage. In this case, in an embodiment of the inventive concept, a carry predictor is used to determine the value of carry required for a considerable operation time within a short time so that the overall critical path of the arithmetic operation can be further reduced.

FIG. 1 is a block diagram of the modular multiplier apparatus 100 with a reduced critical path of an arithmetic operation, according to an embodiment of the inventive concept. Referring to FIG. 1, the modular multiplier 100 according to the present embodiment includes a reduction unit 110, a long path carry predictor 120, an accumulator 130, and a feedback decision unit 140.

The modular multiplier 100 obtains a quotient q and the result S, of an arithmetic operation of modular multiplication by using a modulus M and two arbitrary constants A and B. Only part of the modular multiplier 100 is illustrated in FIG. 1.

The reduction unit 110 obtains a short path carry (SPC) included when the result $S_i$ of a modular arithmetic operation is obtained at the current stage, by using a feedback signal FB and the medium calculation result SPP. The long path carry predictor 120 predicts a long path carry (LPC) included when the result $S_i$ of the modular arithmetic operation is obtained at the current stage, by using the medium calculation result SPP. The accumulator 130 accumulates the result $S_i$ of the modular arithmetic operation to generate the final result $S_n$ of the arithmetic operation by using the SPC and LPC. When it is determined that subtraction on the arithmetic operation is not generated by the reduction unit 110, the feedback decision unit 140 propagates the LPC that is obtained at the previous stage to be output from the long path carry predictor 120 to the reduction unit 110 as the feedback signal FB.

Here, the value of the LPC is 0 if binary bits that constitute the medium calculation result SPP are all "0"s and only a most significant bit (MSB) of the binary bits is 1 and the other bits are all "0", and if otherwise, the value of the LPC is 1.

Also, when a modified booth recoding method is applied to the quotient q, the value of the LPC is 0 when the value of the medium calculation result SPP is 0, and when the value of the medium calculation result SPP is not 0, the value of the LPC is 1.

An operation of the modular multiplier 100 of FIG. 1 will now be described.

When subtraction is performed, the long path carry predictor 120 predicts the LPC from the previously-obtained medium calculation result SPP and propagates the LPC to the accumulator 130. If it is determined that subtraction is performed, the feedback decision unit 140 transmits the feedback signal FB having a value of 0 to the reduction unit 110. SPC can be processed in parallel to preparing and operating of the accumulator 130.

Otherwise, if it is determined that subtraction is not performed, the LPC output from the long path carry predictor 120 is always 0. Thus, the feedback decision unit 140 converts the value of the feedback signal FB into 1 so as to add the LPC that is obtained prior to one cycle to a least significant bit (LSB) of a current cycle and transmits the converted value of the feedback signal FB to the reduction unit 110.

An operation for readily determining the value of the LPC will be described below.

Figure 2:
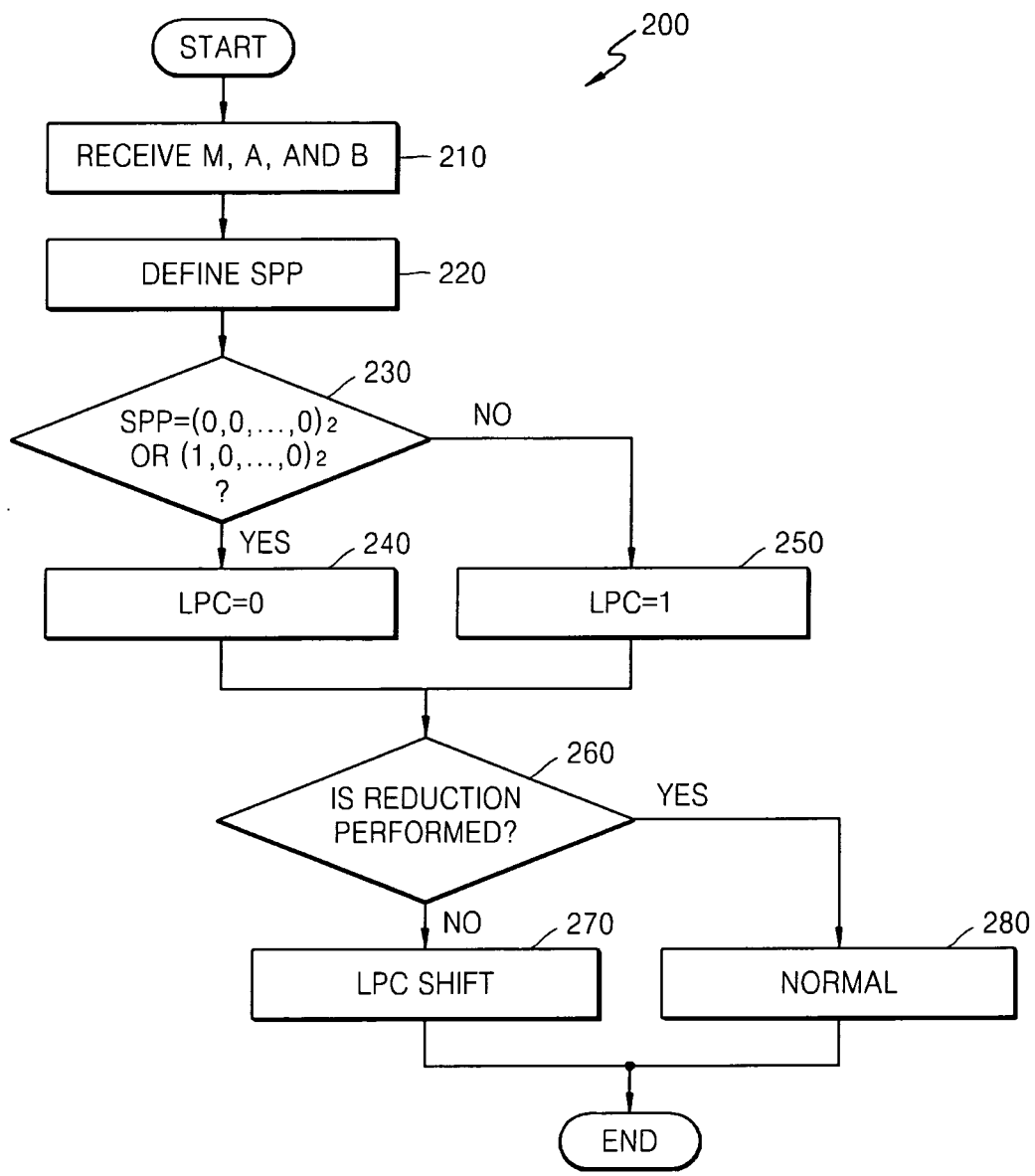
FIG. 2 is a flowchart illustrating a method of reducing a critical path of an arithmetic operation, according to an embodiment of the inventive concept.

FIG. 2 is a flowchart illustrating a method 200 of reducing a critical path of an arithmetic operation, according to an embodiment of the inventive concept. Referring to FIG. 2, the method 200 of reducing a critical path of an arithmetic operation, according to the present embodiment of the inventive concept, includes: receiving a modulus M and two arbitrary constants A and B (Operation 210), defining a medium calculation result SPP (Operation 220), determining the value of the LPC (Operations 230, 240, and 250), and determining the use of the value of the LPC (Operations 260, 270, and 280).

In Operation 220, the medium calculation result SPP is defined using Equation 1 above.

Operations 230, 240, and 250 of determining the value of the LPC include: determining whether binary bits that constitute the medium calculation result SPP are all "0" or whether only a most significant bit (MSB) of the binary bits is 1 and the other bits are all "0"s (Operation 230); if the binary bits that constitute the medium calculation result SPP are all "0"s or if only the MSB of the binary bits is 1, the value of the LPC is determined to be 0 (Operation 240); and if the binary bits that constitute the medium calculation result SPP are not all "0"s or if any bit other than the MSB of the binary bits is 1, the value of the LPC is determined to be 1 (Operation 250).

Also, when a modified booth recoding method is used in the quotient q, the value of the LPC is determined to be 0 when the value of the medium calculation result SPP is 0, and when the value of the medium calculation result SPP is not 0, the value of the LPC is determined to be 1.

Operations 260, 270, and 280 of determining the use of the value of the LPC include: determining whether reduction is performed on the modular arithmetic operation when the result $S_{i-1}$ of the modular arithmetic operation is obtained at the previous stage (Operation 260), and if it is determined that reduction is not performed on the modular arithmetic operation; shifting the LPC that is obtained at the previous stage when the result $S_i$ of the modular arithmetic operation is obtained at the current stage (Operation 270); and if reduction is performed on the modular arithmetic operation otherwise, shifting the LPC obtained at the previous stage when the result $S_i$ of the modular arithmetic operation is obtained at the current stage (Operation 280).

Hereinafter, a procedure in which the modular multiplier 100 of FIG. 1 and the method 200 of reducing a critical path of an arithmetic operation of FIG. 2 are derived will be described.

First, an operation of obtaining the result $S_i$ of the modular arithmetic operation at the current stage from Montgomery modular multiplication by using radix $2^k$ will be described.

Figure 3:
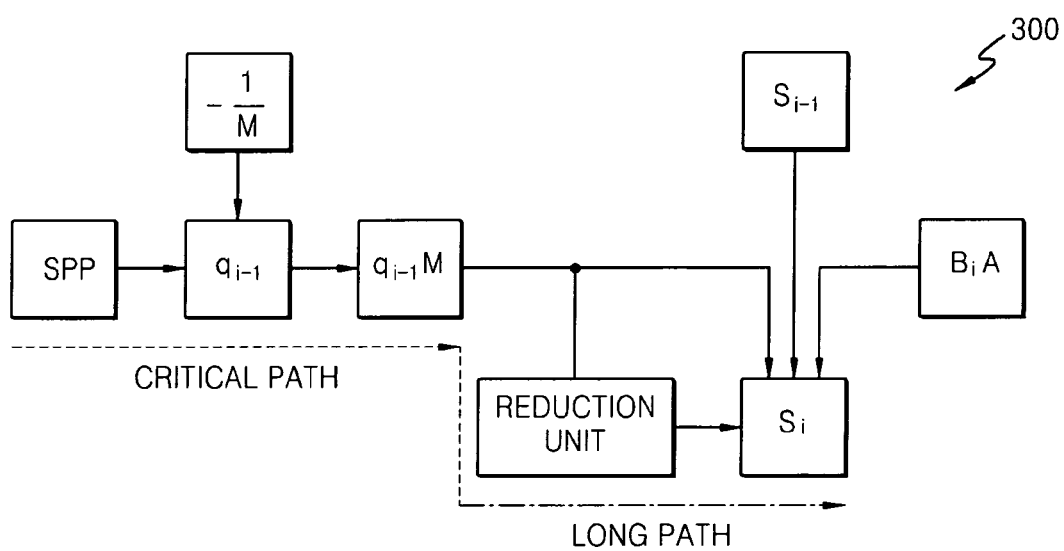
FIG. 3 is a diagram illustrating the dependency of medium arithmetic operations of a Montgomery modular multiplication algorithm.

FIG. 3 is a diagram illustrating the dependency of medium arithmetic operations of a Montgomery modular multiplication algorithm. Referring to FIG. 3, an overall critical path of an arithmetic operation on which a Montgomery modular multiplication algorithm is performed includes a critical path (CP) that is marked by a dotted line and the LPC that is marked by a chain thin line.

The CP that is marked by the dotted line is used in the operation of calculating a product $q_{i-1}M$ of a quotient $q_{i-1}$ at the previous stage and a modulus M so as to obtain the result $S_i$ of the modular arithmetic operation at the current stage, and the LPC that is marked by the long-short dash line used in the operation of obtaining a carry generated by performing subtraction.

When the product $q_{i-1}M$ of the quotient $q_{i-1}$ obtained at the previous stage and the modulus M and the medium calculation result SPP are added to each other, a quotient q is defined so that subtraction can be performed. Thus, the value of carry obtained from the final result generated by a reduction unit such as the reduction unit 110 of FIG. 1 is conducive to reduce the CP. Most carries are generated by performing a comparatively short-term operation. However, in order to make the final result 0 in a non-redundant form, the value of carry that passes through the longest path is present. In an embodiment of the inventive concept, the value of carry that is determined via the longest path is predicted so as to minimize the CP.

In the case of radix $2^k$, carry propagation occurs between at least k adders. In order to generate a quotient q to be used in the next stage, the carry needs to be shifted to the final result of a cycle and thus, the modular arithmetic operation is delayed until the last carry is generated.

In a modular multiplier for reducing a critical path of an arithmetic operation such as the modular multiplier 100 of FIG. 1, a carry predictor is included in a reduction unit for performing reduction shown in FIG. 3 so that the arithmetic operation can be performed within a short time by predicting the value of the last carry.

Figure 4:
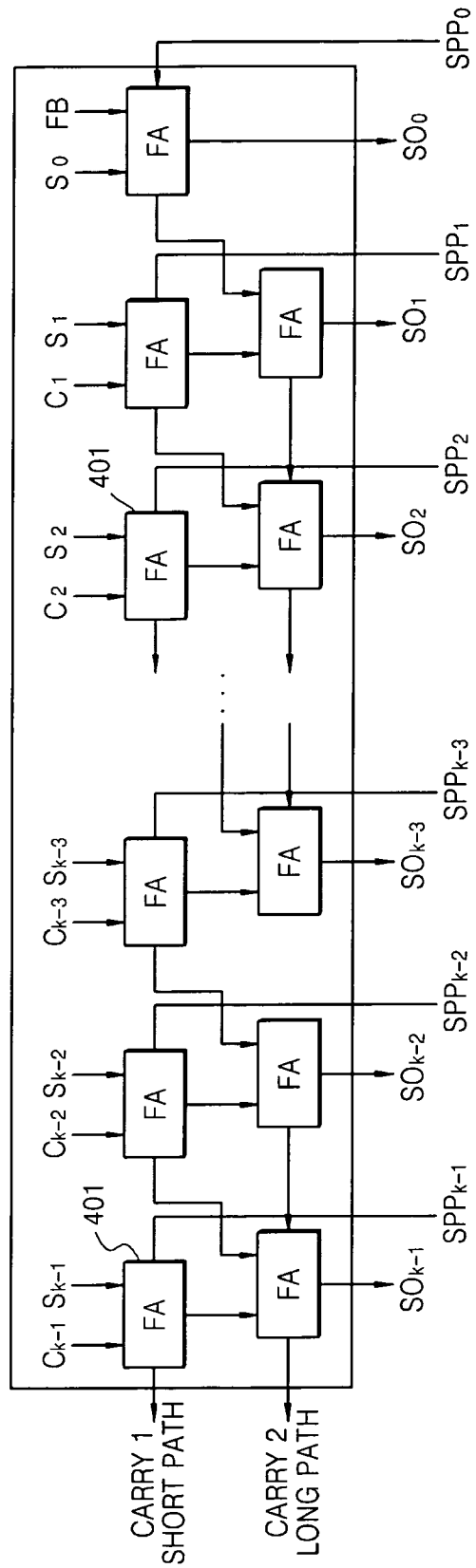
FIG. 4 is a block diagram of a block of a reduction unit for performing final reduction, according to an embodiment of the inventive concept.

FIG. 4 is a block diagram of a block of a reduction unit for performing final reduction, according to an embodiment of the inventive concept. Referring to FIG. 4, two carries such as carry 1 and carry 2 are finally output. Carry 1 passes through only an adder 401 and thus can be relatively quickly determined, as compared to carry 2 that is determined by passing through a plurality of adders FA. As such, a delay time of a modular multiplier such as the modular multiplier 100 of FIG. 1 is determined by carry 2. Thus, if the value of carry 2 can be previously predicted, i.e., if carry 2 is determined without passing through a plurality of carry propagation paths, an arithmetic operation can be performed within a short time.

Carry $C_1$ to $C_{k-1}$ and sums $S_0$ to $S_{k-1}$ that propagate from an upper part of the reduction unit are the result of an arithmetic operation performed on qM, and medium calculation results $SPP_1$ to $SPP_{k-1}$ that propagate from a lower part of the reduction unit are defined using Equation 1 above.

An arithmetic operation performed by the reduction unit may be expressed using Equation 2:

$$SPP + q_{i-1}M = SPP + \left(SPP \times \left(-\frac{1}{M} \times M\right)\right) \bmod 2^k \quad (2)$$
$$= SPP\left(1 - \frac{1}{M} \times M\right) \bmod 2^k$$

$\frac{1}{M} \times M$ is expressed as a k-bit binary number such as $(0,0, \ldots, 1)_2$ according to the definition of an inverse element. Here, the number 0 is k−1, wherein only an LSB of the k-bit binary number is 1.

$-\frac{1}{M} \times M$ is expressed as $(1,1, \ldots, 1)_2$, wherein k bits are all "1"s, in a k-bit binary number according to the definition of 2's complement. By referring to this result, the arithmetic operation shown in Equation 2 may be expressed again by Equation 3:

$$SPP + q_{i-1}M = SPP \times [(0,0, \ldots, 1)_2 + (1,1, \ldots, 1)_2] \bmod 2^k \quad (3)$$

As shown in Equation 3, when an arithmetic operation is performed on $\left(1 - \frac{1}{M} \times M\right)$, carry 1 is generated in a (k+1)-th term, and the other lower bits are all "0"s. The value of the LPC can be predicted any time based on the result of the arithmetic operation.

When Montgomery modular multiplication is performed, several recoding methods may be used so as to implement a product qM of a quotient q and a modulus M. Here, recoding involves substituting a quotient q for another value that is equal to an original value of the quotient q so as to efficiently implement multiplication of the product qM, such as booth recoding, modified booth recoding, and non-adjacent form (NAF).

First, a case when the value of the quotient q is not recoded but is directly multiplied by the modulus M, according to an embodiment of the inventive concept, will be described.

Referring to FIG. 4, if a value of "1" is present in a plurality of carries $C_1$ to $C_{k-2}$ and a plurality of sums $S_0$ to $S_{k-2}$ input from an upper part of the reduction unit used to generate carry 2, at a subtraction stage, the value of "1" will be propagated to the adders FA at a bottom end of the reduction unit and then will be added to other values and output from carry 2 of a long path.

Also, if a "1" is present in a plurality of medium calculation results $SPP_0$ to $SPP_{k-2}$ input from a lower part of the reduction unit, an LSB of M and −1/M is 1. Thus, a bit of the quotient q is 1 in the lowest position of a bit of $SPP_0$ to $SPP_{k-2}$ which has value 1. The plurality of carries $C_1$ to $C_{k-2}$ and the plurality of sums $S_0$ to $S_{k-2}$ input from the upper part of the reduction unit are the result of an arithmetic operation performed on qM. Thus, when the value of the quotient q is as described above, at least one value that is not 0 is present in the plurality of carries $C_1$ to $C_{k-2}$ and the plurality of sums $S_0$ to $S_{k-2}$ input from the upper part of the reduction unit.

If a value of "1" is present in the other medium calculation results $SPP_0$ to $SPP_{k-2}$ and not in the final medium calculation result $SPP_{k-1}$, at least one value of "1" is present in the plurality of carries $C_1$ to $C_{k-2}$ and the plurality of sums $S_0$ to $S_{k-2}$ and thus, the value of carry 2 of the long path is always "1".

If the value of the final medium calculation result $SPP_{k-1}$ is "1" and the other medium calculation results $SPP_0$ to $SPP_{k-2}$ are all "0"s, only an MSB of the quotient q is "1", and in Montgomery modular multiplication, an LSB of the modulus M is always "1". Thus, only an MSB of the product qM is "1", and the other bits are all "0"s. That is, the value of carry 1 generated by the adder 401 is "1" but the value of carry 2 will be "0".

If the medium calculation results $SPP_0$ to $SPP_{k-1}$ are all "0"s, the result of an arithmetic operation using Equation 3 is always "0" and thus, carry 1 and carry 2 are all "0"s.

Summarizing the above description, carry 2 that is the LPC may be expressed using Equation 4:

Carry 2=0, if *SPP* is $(0,0, \ldots , 0)_2$ or $(1,0, \ldots , 0)_2$=1, otherwise. (4)

A case when the quotient q is recoded and is multiplied by the modulus M will now be described.

In recoding, a k-bit is substituted for another bit that is equal to an original value of k-bits in a one-to-one manner. Thus, a case when the other plurality of carries $C_1$ to $C_{k-2}$ and the other plurality of sums $S_0$ to $S_{k-2}$, and not final carry $C_{k-1}$ and not the final sum $S_{k-1}$, are all "1"s can be checked, and in the case, the value of carry 2'—comment E', that is the LPC is always 1.

Also, if one of the final carry $C_{k-1}$ and the final sum $S_{k-1}$ is 1 and the other plurality of carries $C_1$ to $C_{k-2}$ and the other plurality of sums $S_0$ to $S_{k-2}$ are all "0"s, the value of carry 1 that is the SPC is always 1, and the value of carry 2 is always 0.

Reduction is generated by the reduction unit of FIG. 4. Thus, if C+S=(100 . . . 0)$_2$, the medium calculation result SPP=(100 . . . 0)$_2$. In this case, the value of carry 1 is 1, and the value of carry 2 is 0.

The result of addition should be 0. Thus, there is no case when the MSBs $C_{k-1}$ and $S_{k-1}$ of carry and sums are all "1"s, and the other lower bits are all "0"s.

The above description is summarized as below:
1. Lower (k−1)-bits $C_1$ to $C_{k-2}$ and $S_0$ to $S_{k-2}$ of carry and sums are all "0"s;
   1-1. If MSBs $C_{k-1}$ and $S_{k-1}$ of carry and sums are (0,0), the medium calculation result SPP is also 0, and carry is not generated.
   1-2. If any one of MSBs $C_{k-1}$ and $S_{k-1}$ of carry and sums is 1, the value of only carry 1 is 1.
   1-3. There is no case when the MSBs $C_{k-1}$ and $S_{k-1}$ of carry and sums are (1,1), and thus this case is not considered.
2. "1" is present in one of the lower (k−1)-bits $C_1$ to $C_{k-2}$ and $S_0$ to $S_{k-2}$ of carry and sums;
   the value of carry 2 that is the LPC is 1.

The above description may be summarized using Equation 4 that indicates a case when the value of a quotient q is directly obtained.

That is, both in the case when the value of the quotient q is directly obtained and in the case when the quotient q is recoded, the LPC can be predicted at the subtraction stage.

When the product qM is obtained using a modified booth recoding method applied to the quotient q, the reduction unit can be constituted so as to implement a carry predictor that operates in more simplified conditions, as compared to a conventional modular multiplier. That is, the reduction unit is constituted so that, if the value of the medium calculation result SPP is 0, the value of carry 2 that is the LPC can be 0 and if the value of the medium calculation result SPP is not 0, the value of carry 2 can be always 1.

If the modified booth recoding method is used, the quotient q is divided by 2 bits and is substituted for a value selected from among {−2, −1, 0, 1, 2} by referring to the previous value of one bit. Thus, in this case, k is an even number.

If the value of the medium calculation result SPP is (1,0, . . . , 0)$_2$, a recoding value of the quotient q to be multiplied by the uppermost term is −2 (in the case of an even number), and the other recoding values are all "0"s. When a negative number is processed, 1 is added to an LSB of the medium calculation result SPP so as to convert a 1's component 1 into a 2's component, and the value is assumed as negative (NEG).

When k is an even number, the relationship between NEG according to upper 2-bits $S_{k-1}$ and $S_{k-2}$ of the medium calculation result SPP and the bit $S_{k-2}$ to be substantially fed back and added to NEG is shown in Table 1.

TABLE 1

| $S_{k-1}, S_{k-2}$ | NEG | $S_{k-2}$ |
|---|---|---|
| 00 | 0 | 0 |
| 01 | 0 | 1 |
| 10 | 1 | 0 |
| 11 | 1 | 1 |

In modified booth recoding, $(S_{k-1}, S_{k-2})$=(1,0) and (1,1) are respectively interpreted as −2 and −1. Thus, −2M and −M are respectively added to NEG. In this case, it has been already described that a value for adding 1 to an LSB of the medium calculation result SPP so as to convert a 1's component 1 into a 2's component is NEG.

It is assumed that NEG is shifted to an arithmetic operation procedure of carry and sums propagated from the upper part of the reduction unit during subtraction of the reduction unit of FIG. 4 and $S_{k-2}$ is shifted to the block of the reduction unit illustrated in FIG. 4. In this case, if the value of NEG is 1, the value will be added to −2M and will be shifted to carry 1. In order to shift the value in carry 2 that is the LPC, NEG and $S_{k-2}$ are not directly input but are converted into NEG' and $S_{k-2}$' and then are input according to the relationship shown in Table 2.

TABLE 2

| NEG, $S_{k-2}$ | NEG' | $S_{k-2}$' |
|---|---|---|
| 00 | 0 | 0 |
| 01 | 0 | 1 |
| 10 | 0 | 1 |
| 11 | 1 | 1 |

As shown in Table 2, when one of NEG and $S_{k-2}$ is 1, a problem occurs and thus, the values are allocated so that the $S_{k-2}$' can be always 1.

Figure 5:
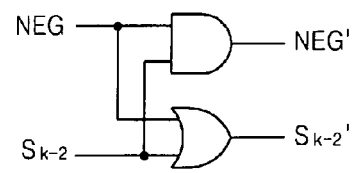
FIG. 5 illustrates a conversion circuit for performing the conversion shown in Table 2, according to an embodiment of the inventive concept.

FIG. 5 illustrates a conversion circuit for performing the conversion shown in Table 2, according to an embodiment of the inventive concept.

Figure 6:
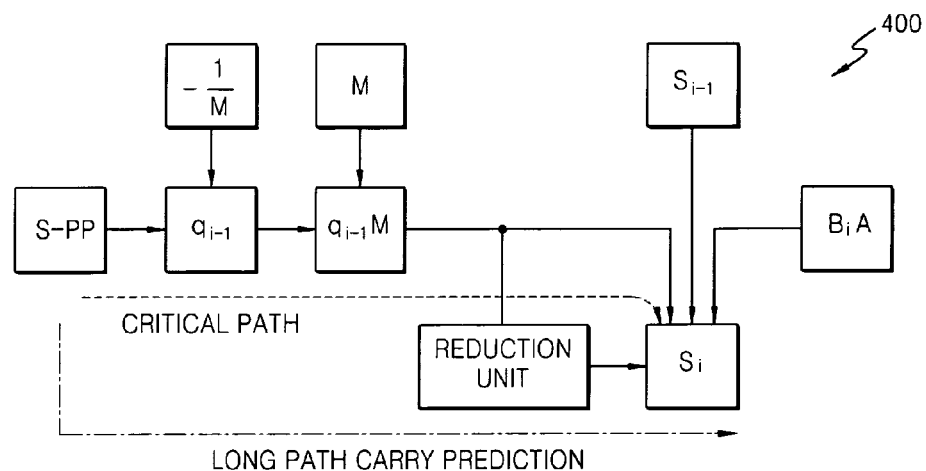
FIG. 6 illustrates a change of a critical path of an arithmetic operation according to carry prediction of a reduction unit according to an embodiment of the inventive concept.

FIG. 6 illustrates a change of a critical path of an arithmetic operation according to the carry prediction of a reduction unit, according to an embodiment of the inventive concept. FIG. 6 is different from FIG. 3 in that, when the method 200 of reducing a critical path of an arithmetic operation illustrated in FIG. 2 is used, the critical path that is marked by the dotted line and the long path carry prediction that is marked by the long-short dash line proceed in parallel and thus, an overall critical path of the arithmetic operation is not determined by the sum of the critical path and the long path carry prediction.

Assuming that a delay of an adder is same as a gate delay and a reduction unit and another functional block operate in parallel, a simulation about the ratio of the reduction unit to an overall critical path of an arithmetic operation has been performed.

Figure 7:
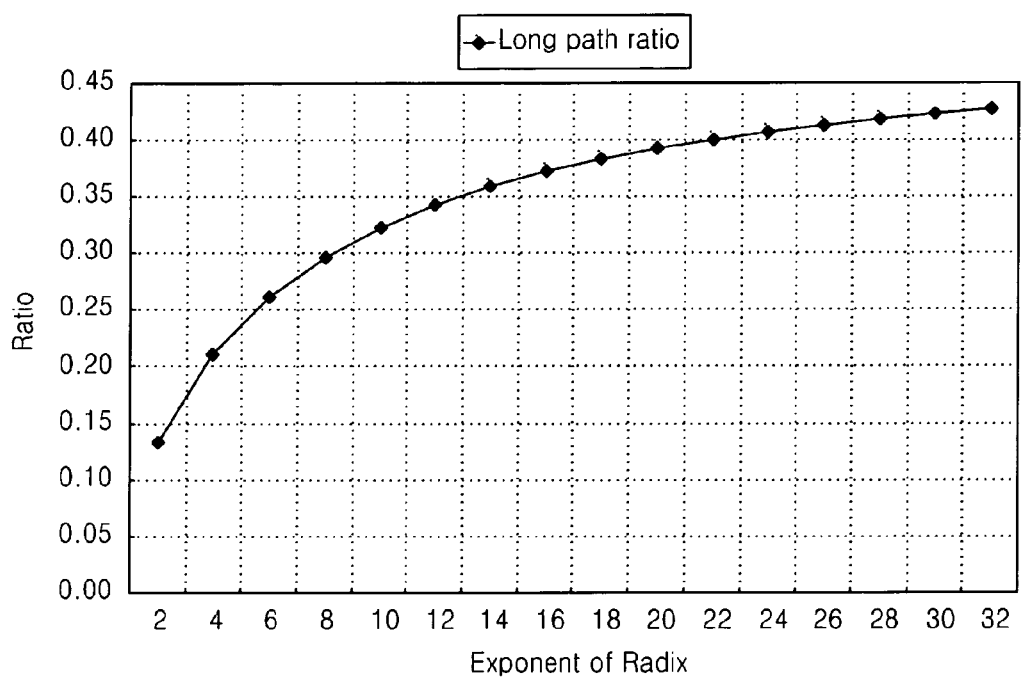
FIG. 7 is a graph showing the ratio of a reduction to an overall critical path of an arithmetic operation.

FIG. 7 is a graph showing the ratio of a reduction unit to an overall critical path of an arithmetic operation. Referring to FIG. 7, in k-bit carry propagation, as an exponent of the radix increases, an operating time increases from about 12% to about 40%. Thus, in an embodiment of the inventive concept, an increase in the operation speed up to 1.2 to 1.8 times of a maximum operating frequency is obtained.

While the inventive concept has been particularly shown and described with reference to exemplary embodiments thereof, it will be understood that various changes in form and details may be made therein without departing from the spirit and scope of the following claims.

What is claimed is:

1. A modular multiplier apparatus for obtaining a quotient $$q_i = -\frac{1}{M} \times S_{i-1} \bmod 2^k$$

and a result $$S_i = \frac{S_{i-1} + B_i A + q_{i-1} M}{2^k}$$

of an arithmetic operation of modular multiplication by using a modulus satisfying a condition $-M<A, B<M$ where $$B = \sum_{i=0}^{n-1} B_i 2^{ki} \text{ and } B_i \in \{0, 1, \cdots, (2^k - 1)\}$$

and two arbitrary constants A, B, the modular multiplier apparatus comprising:
   a reduction unit for obtaining a short path carry (SPC) included when a result $S_i$, of a modular arithmetic operation is obtained at an ith loop, by using a medium calculation result SPP at an (i−1)th loop;
   a carry predictor for predicting a long path carry (LPC) included when the result of the modular arithmetic operation is obtained at the ith loop, by using the medium calculation result SPP at the (i−1)th loop; and
   an accumulator for accumulating the result $S_i$, of the modular arithmetic operation obtained at the ith loop to a result $S_{i-1}$ of the modular arithmetic operation obtained at the (i−1)th loop by using the SPC and the LPC,
   wherein the medium calculation result SPP is obtained by adding the result $S_{i-1}$ of the modular arithmetic operation obtained at the (i−1)th loop and a partial product $B_i A$ of the two constants obtained at the ith loop, and the SPC is obtained by the sum of a carry $C_{k-1}$, a sum $(S_{k-1})$, and a medium calculation result $SPP_{k-1}$ with respect to a lower k-1 bit on which the reduction is performed.

2. The modular multiplier apparatus of claim 1, wherein a value of the LPC is 0 if binary bits that constitute the medium calculation result are all "0"s and when only a most significant bit (MSB) of the binary bits is 1 and the other bits are all "0"s, and if otherwise, the value of the LPC is 1.

3. The modular multiplier apparatus of claim 1, wherein, when a modified booth recoding method is applied to the quotient, a value of the LPC is 0 when a value of the medium calculation result is 0, and when the value of the medium calculation result is not 0, the value of the LPC is 1.

4. The modular multiplier apparatus of claim 1, further comprising a feedback decision unit to propagate the LPC that is obtained at the (i−1)th loop to be output from the carry predictor to the reduction unit if it is determined that the reduction on the arithmetic operation is not generated by the reduction unit, wherein the reduction unit shifts the LPC obtained at the (i−1)th loop to an operation at the ith loop.

5. A method of reducing a critical path of a modular arithmetic operation of a modular multiplier apparatus for obtaining a quotient $$q_i = -\frac{1}{M} \times S_{i-1} \bmod 2^k$$

and a result $$S_i = \frac{S_{i-1} + B_i A + q_{i-1} M}{2^k}$$

of the modular arithmetic operation using a modulus satisfying a condition $-M<A, B<M$ where $$B = \sum_{i=0}^{n-1} B_i 2^{ki} \text{ and } B_i \in \{0, 1, \cdots, (2^k - 1)\}$$

and two arbitrary constants A, B, the method comprising:
   a reduction unit obtaining a short path carry (SPC) included when a result $S_i$ of a modular arithmetic operation is obtained at an ith loop, by using a medium calculation result SPP at an (i−1)th loop;
   a carry predictor predicting a long path carry (LPC) included when the result of the modular arithmetic operation is obtained at the ith loop, by using the medium calculation result SPP at the (i−1)th loop; and
   an accumulator accumulating the result $S_i$ of the modular arithmetic operation obtained at the ith loop to a result $S_{i-1}$ of the modular arithmetic operation obtained at the (i−1)th loop by using the SPC and the LPC,
   wherein the medium calculation result SPP is obtained by adding the result $S_{i-1}$ of the modular arithmetic operation obtained at the (i−1)th loop and a partial product $B_i A$ of the two constants obtained at the ith loop, and the SPC is obtained by the sum of a carry $C_{k-1}$, a sum $(S_{k-1})$, and a medium calculation result $SPP_{k-1}$ with respect to a lower k-1 bit on which the reduction is performed.

6. The method of claim 5, wherein predicting the value of the LPC comprises:
   determining whether binary bits that constitute the medium calculation result are all "0"s or whether only a most significant bit (MSB) of the binary bits is 1 and the other bits are all "0"s;
   determining the value of the LPC as 0 if the binary bits that constitute the medium calculation result are all "0"s or if only the MSB of the binary bits is 1 and determining the value of the LPC as 1 otherwise.

7. The method of claim 5, wherein the determining of the use of the value of the LPC comprises:
   determining whether reduction is performed on the modular arithmetic operation when the result of the modular arithmetic operation is obtained at the (i−1)th loop;
   if it is determined that reduction is not performed on the modular arithmetic operation, shifting the LPC that is obtained at the (i−1)th loop when the result of the modular arithmetic operation is obtained at the ith loop; and
   if reduction is performed on the modular arithmetic operation, shifting the LPC obtained at the (i−1)th loop when the result of the modular arithmetic operation is obtained at the ith loop.

8. The method of claim 5, wherein, when a modified booth recoding method is applied to a quotient obtained when the result of the modular arithmetic operation at the ith loop, the value of the LPC is 0 when a value of the medium calculation result is 0, and when the value of the medium calculation result is not 0, the value of the LPC is 1.

9. The method of claim 8, wherein the result of the modular arithmetic operation that is obtained at the ith loop is obtained by adding a product of the result of the arithmetic operation obtained at the (i−1)th loop and the medium calculation result and a product of a quotient obtained at the (i−1)th loop and a modulus, and the quotient of modular multiplication is obtained by the sum of modular arithmetic operations of a product of the modulus and the product of the result of the arithmetic operation obtained at the (i−1)th loop.

* * * * *